UNITED STATES PATENT OFFICE.

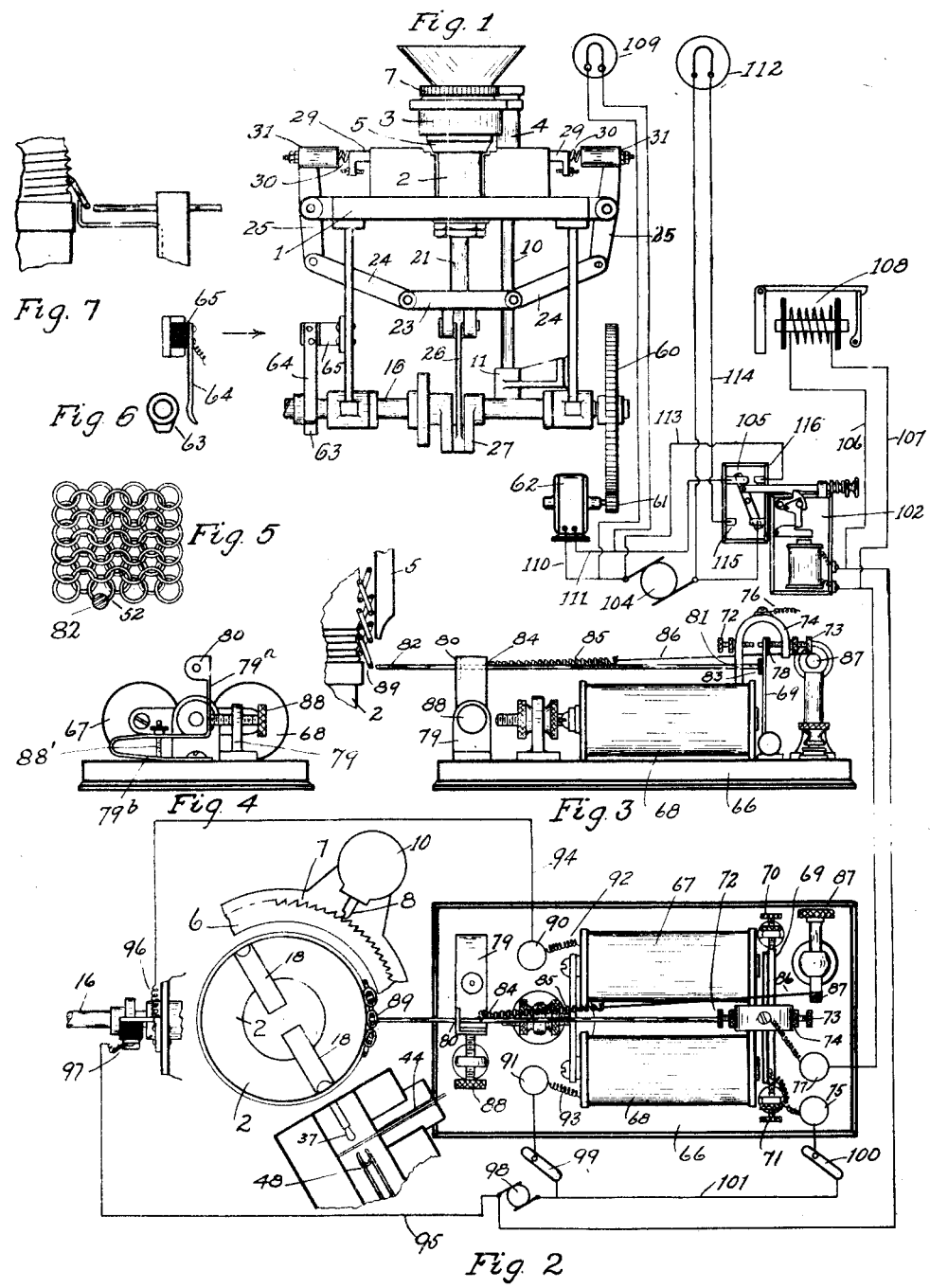

ARCHIBALD THOMAS SAMPSON, OF LYNN, MASSACHUSETTS, ASSIGNOR, BY MESNE ASSIGNMENTS, TO MARY S. SAMPSON, OF LYNN, MASSACHUSETTS.

STOP MECHANISM FOR MOVING MACHINERY.

1,072,509.

Specification of Letters Patent.

Patented Sept. 9, 1913.

Application filed March 17, 1913. Serial No. 754,824.

*To all whom it may concern:*

Be it known that I, ARCHIBALD THOMAS SAMPSON, citizen of the United States, residing at Lynn, in the county of Essex and State of Massachusetts, have invented certain new and useful Improvements in Stop Mechanism for Moving Machinery, of which the following is a specification.

This invention relates to improvements in automatic stop mechanism for moving machinery of the type adapted particularly for the manufacture of articles composed of a mesh-like structure such for example, as the manufacture of so-called " ring mesh ", the latter being utilized for the making of ladies' hand-bags, etc. One very annoying difficulty which has been experienced where these machines are employed is that it often happens that a link or links is or are " missed " in the making of the mesh, for reasons which it is unnecessary to specify in the present application, and that in such event the particular machine making the mesh continues to operate subsequently to having passed the point at which the machine has failed to form the link. The consequence of this failure of the machine to stop at that point results in a hole being left in the fabric or mesh - like structure which necessitates the cutting away all the fabric formed beyond the point at which the hole exists, and starting over again from that point; and it will be seen that this results in considerable inconvenience and waste of stock, as the machine, being automatic in character, may form a considerable amount of fabric beyond the point of " failure " before said " failure " is discovered. When a large number of machines (as many as one hundred or two hundred) are sometimes utilized at one time in the manufacture of this class of material, it will be obvious that the continuous operation of these machines after links have failed to be formed in many of them, results in great hardship, waste of stock, and annoyance. It will be seen therefore, that any mechanism which will successfully avoid this difficulty and cause each machine to automatically stop at or near the point at which a link fails to be formed, will be a valuable advance in the art. I have invented such a mechanism and one which permits an attendant to operate five or more times the number of machines now possible because of the constant supervision necessary to see that no links are missed or that the desired quality or condition of the product is maintained, and for clearness of understanding I have illustrated and described it in the accompanying specification and drawings as being applied to the specific machine shown in the United States Patent to Alonzo Comstock Pratt, No. 948,615, dated February 8, 1910, machine for making link mesh. It is to be understood however that I do not restrict my invention, in its application, to this particular machine, as it may be applied with equal merit to any machine of the same general character. Neither do I wish my invention to be interpreted to be limited in its application to machinery for forming fabrics only, as it may be applied equally as well to any kind of moving machinery wherein it is desirable to stop said machinery automatically for any reason, within its principle of application.

The principle, generically, involves the idea of causing a rod or " detector " to coöperate with the link-fabric formed in such manner (as by means of suitable coöperative actuating mechanism) as to shut off or disengage the motive power which drives the machine. Together with the act of shutting off the power, it also indicates by means of suitable annunciator devices, that the machine is either in or out of operation, and in the practical application of my invention, where a plurality of machines are utilized in the manufacture referred to, which particular machines are in or out of operation. These annunciator devices may comprise such means of signaling as ringing a bell, lighting varied colored lights, or operating an annunciator drop. The specific means employed and illustrated in the present case is to cause white lights to be illuminated on the machines in operation and red lights to be illuminated on the machines which are out of operation. In addition to this a drop annunciator may be actuated, which drop annunciator may be placed either in the room where the machines are located or in the manager's office, or both, as desired. In this manner the performance of the machine can be closely watched, and the efficiency of the plant greatly enhanced. The mechanism may be caused to operate within a range of from within less than a thousandth of an inch upward.

In the application to the particular machine shown in the Pratt patent, I employ a sensitive relay, upon which is mounted to have a reciprocating motion, a rod or "detector" as I shall hereafter designate it, which "detector" or feeler is actuated to abut against a link which has just been formed, but while said link is stationary, or it may abut against the mesh at a place where two or more links overlap. I also provide a suitable timing device mounted upon the crank-shaft of the machine, or at any other operative location thereon and in suitable electrical connection with the relay, in order that the latter may be energized at periods approximately in synchronism with the ratcheting device which moves the mesh forward one link at a time. When the relay is thus energized it causes the "detector" to be moved in its travel far enough to abut against a link which has been made by one of the forming devices. While of course in this case the detector would be so timed as to operate at a period when the link or mesh was stationary, it is within the conception of my invention to provide a form of detector which would be practical for use in the manufacture of continuously moving material, either a mesh-like texture or otherwise, in order to determine the variation in thickness of the material being thus woven or manufactured. The probable construction of such a detector would be one which would have a thin blade normally in engagement with a continuously moving material and making contact with said material, the blade being made of a thin, spring like metal in order that when the moving material undergoing manufacture varied in thickness from the predetermined limit for which the adjustments were set, the blade would be carried with it a slight amount but would have such resiliency that it would immediately return to its normal position upon relief of tension.

In the present application of my invention the detector does not move far enough, when a link is present before it, to allow the contacts on the other side of the relay to close. Consequently, the electric latching device, which is provided on that side of the circuit, does not operate and the machine continues to do its work without interruption. Should, however, a link fail to be formed, or be smaller in cross-section, the "detector" on account of the absence of its engagement with the link is allowed to travel far enough to allow the contacts at the other end of the relay to close and energize the electric latching device, thus opening the circuit of the electric motor driving the machine and stopping said machine, or the electric latch may release a weight which ships the driving belt, should the machine be driven by purely mechanical power instead of electrical. Of course it will be understood that the "detector" may be operated by mechanical means instead of electrical and trip a latch which by releasing a spring or weight may actuate mechanical means for stopping the machine and at the same time work mechanical or electrical indicating mechanism, but I prefer to show the operation as an electrical one.

The details of construction and operation of my invention will be more clearly understood by reference to the accompanying specification and drawings in which—

Figure 1 is an elevation of a link forming machine of the type herein referred to showing only such parts as are necessary to illustrate the carrying out of my invention; Fig. 2 is a plan view of such parts showing in plan the relay employed with the automatic stop mechanism of my invention in operative relation with the link forming machine and showing diagrammatically the electrical circuits and mechanism involved in my invention, Fig. 3 is an elevation of the relay and a partial elevation of the drum with which it coöperates, and the fabric formed thereon being shown in section, Fig. 4 is an end elevation of the relay and the support for the detector carried thereby, Fig. 5 is a front view of a portion of the mesh formed on and carried by the drum, and showing how the detector engages one of the links of said mesh, Fig. 6 is an end elevation of the timing device employed with the stop mechanism of my invention looking in the direction of the arrow, and Fig. 7 is a modification of the device for supporting the mesh or product as it passes before the detector in order to provide against any improper displacement of the link or product.

For clearness of understanding the present applicant deems it advisable to utilize the same numbering of parts and specific reference to figures illustrated in the Pratt Patent, 948,615 so far as it may be practicable. Bearing this in mind, 1 represents the table of the link mesh making machine, 2 the mandrel or drum, 3 the ring which is supported by the post 4; 5, the sleeve upon which is a plurality of ridges and depressions which project into the shallow depressions between lines of the rings of the mesh so that when sleeve 5 is rotated it causes the sleeve of mesh to rotate with it, and as the spirally arranged ridges on the mandrel 2 project into the corresponding depressions on the inner side of the mesh when the sleeve of ring mesh is rotated by the sleeve 5, it will follow the spirally arranged grooves and depressions upon the mandrel 2. The mandrel 2 being stationary the mesh will be caused to move upward vertically by the threads upon the mandrel; 7 represents the ratchet teeth on the sleeve 5 for actuating the latter to cause the mesh to move in a step-by-step manner after each link is formed; 10 represents the shaft which carries the spring-pressed pawl 8 for actuating the ratchet teeth 7, the shaft 10 extending downwardly through an opening in post 4, and the bearing 11 secured to the frame of the machine and at its lower end has a bell-crank lever (not shown) secured thereto. Upon each rotation of the shaft 16 the bell-crank lever is actuated to rock the shaft 10 in its bearings and the pawl carried thereby actuates the sleeve 5 to rotate a distance equal to one of the teeth of the rack 7, and in this position sleeve 5 is held by a spring-pressed retaining pawl; 29 represents the plunger, 30 represents the die-rods, 31 represents the plunger which is secured to the cross-head 23 having four radiating arms the ends of which are connected to levers 25 pivotally mounted upon the table 1. The cross-head 23 has a connecting-rod 26 pivotally connected thereto and the other end of this rod is pivotally connected to cranks 27 upon the shaft 16.

Referring to Fig. 5, 52 represents a link against which I have elected to represent the detector employed in my invention to abut.

In order to avoid confusion in numbering, I will hereinafter employ a block of numbers beginning with the numeral 60 for the designation of the parts involved in my improved construction.

Referring again to Fig. 1, mounted upon the shaft 16 for driving the latter is a suitable driving means such as a gear 60, meshing with a pinion 61, carried by the motor 62. Also mounted on the shaft 16 is a cam 63 which engages a contact arm 64, the latter being carried by an insulated block 65, which is secured to the frame of the machine as shown.

Referring to Fig. 2, 66 represents a support upon which is mounted an electro-magnetic actuating device such as a sensitive relay having the magnets 67 and 68, this relay being shown in elevation Fig. 3.

Mounted in operative relation with the magnets of the relay is an armature 69 pivotally journaled by means of the adjusting screws 70 and 71. This armature has another adjustment by means of the adjusting screws 72 and 73 mounted in the standard 74. The controlling circuit side of the relay is normally open-circuited as follows: one side of the circuit is connected to the binding post 75, which in turn is connected with the armature 69. The other side of the circuit is connected with the standard 74 at 76 and thence to the binding-post 77, the armature 69 being insulated from the contact screw 73 by means of an insulation block 78. The armature 69 being normally in position to rest, by means of its insulated block, against the contact screw 73, the controlling circuit is open-circuited until the said armature is actuated to move a sufficient distance to engage with the contact screw 72, which action closes the controlling circuit.

Mounted upon the support 66 is a secondary support 79 in which is formed a bearing 80. A second bearing 81 is formed in the standard 74. Supported in these bearings is a rod or detector 82 which engages an insulation block 83 on the armature 69. Attached to the "detector" at some suitable point as at 84 is a spring 85 normally held in tension by means of a string or wire 86 which is wound around an adjusting screw 87, the latter being provided to adjust the tension of the spring any desired amount. The screws 88 and 88' are also provided for affording a compound adjustment of the spring members 79$^a$ and 79$^b$ in order to vary the relative position of the detector with respect to the link, as shown more clearly in Fig. 4. The binding-posts 90 and 91 on the side of the relay facing the machine have connections taken therefrom at 92 and 93 respectively, to the relay magnets while other connections 94 and 95 lead from said binding-posts to the timing device at suitable points, such as 96 and 97. A suitable source of power is provided for delivering electrical energy to this circuit and for the actuation of the other stop mechanism which will be hereinafter referred to. This source of power may be a battery, but in the present case I have preferred to illustrate it as a low voltage generator of the dynamo type such as represented diagrammatically at 98.

Between the generator and the binding-post 91 is a switch 99 which allows the circuit on the machine side of the relay to be opened in order that the adjustments on that side of the circuit may be made without the detector being actuated during such process of adjustment and consequently without stopping the machine. Another switch 100 is provided between the generator 98 and the binding-post 75° in order that adjustments on the controlling circuit side of the machine may be made without shutting down the machine. It may be here mentioned that the relay may be mounted in any suitable place on the machine so long as it is in operative relation with the drum 2; and the relay may be readily detachable from the machine. Another circuit from the generator 98 is provided in which circuit is included the automatic stop mechanism of my invention which is controlled by the relay, one side of this circuit 101 being through the switch 100 and the relay (connections being made through said relay by means of binding-posts 74 and 75) thence through the electric latching device 102. The return side of the circuit is from the latch to the generator 98. The latch controls the main supply circuit of the electric generator shown diagrammatically at 104 which supplies power to the motor 62 for driving the link mesh forming machine, and controls the main switch 105 of said generator by the usual electric latching methods, such as opening the switch upon the release of the latch by means of the energizing of an electro-magnet, which, in the present instance, occurs when the detector operates the relay to close this circuit. A multiple circuit 106, 107 is taken out of the latch circuit for operating the drop annunciator 108. This annunciator may be of the polarized relay type or any well known type and can be reset by pressing a button or by other means common in such cases. It is to be understood that the representation of the annunciator is merely diagrammatic. An electric lamp 109 is connected across the motor circuit 110 and 111 and this gives preferably a white light, which is displayed so long as the motor is running. A lamp of another color 112, preferably red, is connected across the generator circuit by connections 113 and 114. The main switch 105 is fulcrumed in the center, and when the electric latch is released thus breaking the motor and white lamp circuit 110—111, it automatically closes the red lamp circuit 113—114 through the contacts 115—116.

The operation of my invention is as follows: Assuming that the link 52, Fig. 5, is the one which has just been formed and occupies the position in front of the detector 82 as shown in Fig. 3, the timing device 64 on the machine is so adjusted that at this period the circuit 94—95 is closed by said timing device, and energizes the relay magnets, actuating the detector or feeler 82 in such manner as to push it forward and cause the detector to abut against the link and thus assume a potential position to detect a defect in the product. If the link is present the detector is restricted in its travel forward an amount sufficient to prevent the armature 69 from making contact at the contact screw 72 and consequently the controlling side of the circuit of the stop mechanism always remains open unless a link fails to be present to limit the travel of the detector in its forward movement. Should the link fail to be present the detector moves forward, upon being actuated by the timing device, a sufficient distance to allow the armature 69 to make contact at the contact screw 72, and close the controlling circuit. It will thus be understood that each time the ratcheting pawl 8 acts to move a link around the drum the timing device actuates the detector to act as a feeler and determine whether or not the link has been formed. Should the detector find that the link has not been formed the controlling circuit is closed in the manner above explained and the machine is automatically shut down. After each actuation of the detector the latter is returned by means of the spring 85. The detector is thus given an intermittent reciprocating motion corresponding with the actuations of the timing device.

When the controlling circuit is closed the electric latching device 102 is operated by energizing its magnet, releasing the latch and pulling out the main generator switch 105 to open the circuit of the motor 62 and lamp 109. At the same time this action is performed, the switch 105 being properly fulcrumed for the purpose, operates to close the circuit of the red lamp 112 by closing said circuit through the contacts 115, 116. When the latching device 102 is actuated to open the motor circuit the annunciator 108 will also be operated, either in the room where the machines are located or in the manager's office, or both. It will be understood, however, that any interchange of annunciator connections may be employed as desired. For example, it may only be desired to have a single means of annunciation, as by displaying a red light on each machine out of operation; by a single annunciator drop, or by using all of the above-mentioned devices combined. It will also be understood that in the practical operation of my invention a multiple of machines are to be equipped with my improved stop mechanism, the particular annunciator means being selected which will best serve the purpose for efficient supervision of the behavior of all the machines.

It will be seen from the foregoing description of my invention as applied specifically to a machine for manufacturing link mesh, that I have invented a mechanism, the principle of application of which is broader than that of the particular illustration herein shown; that is, I have invented an automatic stop mechanism of great sensitiveness which may be actuated merely by the thickness of the material interposed in front of the detector which causes a relay circuit to release an electric latch and shut off the power which drives the machine, or that the power may be shut off by mechanical means actuated by the detector. The relay circuit referred to may be actuated by the presence or absence of such interposed material in accordance with the choice of the designer of the particular stop mechanism to be employed; whether he wishes to have the presence of the interposed agent actuated the relay circuit or whether he chooses to have the actuation of the relay circuit caused by the absence of the agent. It will be readily understood that such modifications of operation of the invention are merely within the limits of its principle. Other possible variations of the principle would be such as the application to the weaving of cloth fabrics and the like, or even to single strand material wherein the variation in the thickness of the particular fabric or strand undergoing manufacture interposed in front of the detector (or its absence as previously referred to) would actuate the relay circuit. Another possible modification would be to have a contact embedded in the drum upon which the fabric is carried, the said contact being located in an insulated block. In this case one side of the circuit would be made through this contact, the circuit being closed only upon the absence of the fabric in front of the detector which would allow the detector, by the energizing of the relay magnet, to engage the contact on the drum and thus close the circuit for actuating the stop mechanism; but this would not be as preferable an arrangement as the one herein illustrated, for the reason that in the latter case the operating mechanism and contacts are clearly in sight and readily accessible for adjustment.

In the case of the application of my invention to continuously moving material, it is possible to provide two detectors actuated by either separate relays or a compound relay, the detectors being operated to work in opposite directions and the timing adjustments so proportioned that one detector acts momentarily after the other. In this manner provision can be made for taking care of an over-size of the material being turned out by the machine as well as an under-size, the detectors operating the relays as before to either shut down the machine when a pre-determined variation occurs; or operate the annunciator means, or both. If it should be desired to pass the manufactured material between the two detectors the latter could be so arranged as to allow of this being done, for the supporting means shown in Fig. 7 instead of being stationary would be movable and be actuated to move in an opposite direction to the rod detector thus forming in other words, a double detector or calibrating arrangement. In this case a portion of the stationary drum would be recessed out to receive the movable supporting means.

From the foregoing description, taken in connection with the accompanying drawings, the advantages of the construction and of the method of operation will be readily apparent to those skilled in the art to which the invention appertains, and while I have described the principle of operation of the apparatus invention, together with the apparatus which I now consider to be the best embodiment thereof, I desire to have it understood that the apparatus shown is merely illustrative, and that such changes may be made when desired as are within the scope of the claims appended hereto.

I claim—

1. In an automatic mechanism for moving machinery, the combination of an automatic machine, a suitable source of power for driving the machine, a feeler actuated to assume a potential position to detect a defect in the product of said machine during the process of manufacture of said product, an electromagnetic means for actuating the feeler, and suitable mechanism which is actuated to shut off the source of power and stop the machine upon the movement of the feeler from the potential position above mentioned to one which it assumes when a defect occurs in the product.

2. In an automatic mechanism for moving machinery, the combination of an antomatic machine, a suitable source of power for driving the machine, a timing device, a feeler intermittently actuated by the timing device to synchronize with the motions of certain fundamental parts of the machine in order to assume a potential position to detect a defect in the product of the machine during the manufacture of said product, a means for actuating the feeler controlled by the timing device, and suitable mechanism which is actuated to shut off the source of power and stop the machine upon the movement of the feeler from the potential position hereinbefore mentioned to one which it assumes when a defect occurs in the product.

3. In an automatic mechanism for moving machinery, the combination of an automatic machine, a suitable source of power for driving the machine, a feeler intermittently electromagnetically actuated to assume a potential position to detect a defect in the product of said machine during the process of manufacture of said product, an electromagnetic means for actuating the feeler, and suitable mechanism which is actuated to shut off the source of power and stop the machine upon the movement of the feeler from the potential position above-mentioned to one which it assumes when a defect occurs in the product.

4. In an automatic mechanism for moving machinery, the combination of an automatic machine, a suitable source of power for driving the machine, a feeler intermittently electromagnetically actuated to synchronize with the motions of certain fundamental parts of the machine and to assume a potential position to detect a defect in the product of said machine during the process of manufacture of said product, an electromagnetic means for actuating the feeler, and suitable mechanism which is actuated to shut off the source of power and stop the machine upon the movement of the feeler from the potential position above-mentioned to one which it assumes when a defect occurs in the product.

5. In an automatic mechanism for moving machinery, the combination of an automatic machine, a suitable source of power for driving the machine, a feeler intermittently actuated to synchronize with the motions of certain fundamental parts of the machine and to assume a potential position to detect a defect in the product of said machine during the process of manufacture of said product, an electromagnetic means for actuating the feeler, and suitable mechanism which is actuated to shut off the source of power and stop the machine upon the movement of the feeler from the potential position above mentioned to one which it assumes when a defect occurs in the product.

6. In an automatic mechanism for moving machinery, the combination of an automatic machine, a suitable source of power for driving the machine, a feeler in operative relation with the product of the machine when said product is undergoing the process of manufacture, an electromagnetic means for actuating the feeler to assume a potential position to detect predetermined defects in the product, mechanism set into operation by the movement of the feeler from the potential position hereinbefore mentioned to a position which it assumes when such defects occur in order to shut off the source of power and stop the machine, and annunciator means also controlled by the movement of the feeler above specified for indicating that the machine is in or out of operation.

7. In an automatic mechanism for moving machinery, the combination of an automatic machine, a suitable source of power for driving the machine, a supporting means over which the product of the machine moves, a feeler for determining predetermined defects in the product, an electric relay which actuates the feeler to assume a potential position to determine predetermined defects in the product should such defects occur, and mechanism actuated to stop the machine by the movement of the feeler from its potential position to one which it assumes upon the occurrence of predetermined defects.

8. In a mechanism of the character described, the combination of link-forming mechanism, a drum for supporting the link after it is formed in such position that it is woven into a fabric, means for actuating said fabric to move over the drum in a step-by-step manner, an electrically actuated relay in operative relation with the fabric, a detector actuated by the relay, means for operating the relay to actuate the detector in order to determine whether the continuous formation of the fabric is being maintained uninterruptedly, and a means actuated by the detector for shutting off the motive power of the machine in case such interruption occurs.

9. In a mechanism of the character described, the combination of link-forming mechanism, a drum for supporting the link after it is formed in such position that it is woven into a fabric, means for actuating said fabric to move over the drum in a step-by-step manner, an electrically actuated relay in operative relation with the fabric, a detector actuated by the relay, means for operating the relay to actuate the detector in order to determine whether the continuous formation of the fabric is being maintained uninterruptedly, a means actuated by the detector for shutting off the motive power of the machine in case such interruption occurs, and annunciator means controlled by the action of the detector for indicating whether the machine is in or out of operation.

10. In a mechanism of the character described, the combination of a machine for forming link mesh, a sensitive relay in operative relation with said machine, a timing device mounted upon the machine, electrical connections between the timing device and the relay, a detector actuated by the relay to coöperate with the mesh in such manner as to determine the desired condition of the latter, contacts on the relay which are closed by the action of the detector upon a variation from a desired condition in the manufacture of the mesh, mechanism operated by the closing of the contacts for shutting off the power which operates the link-mesh forming machine, and suitable electrical means for operating said mechanism.

11. In a mechanism of the character described, the combination of a machine for forming link mesh, a sensitive relay in operative relation with said machine, a timing device mounted upon the machine, electrical connections between the timing device and the relay, a detector actuated by the relay to coöperate with the mesh in such manner as to determine the desired condition of the latter, contacts on the relay which are closed by the action of the detector upon a variation from a desired condition in the manufacture of the mesh, mechanism operated by the closing of the contacts for shutting off the power which operates the link-mesh forming machine, suitable electrical means for operating said mechanism, and annunciator means controlled by the action of the detector for indicating whether the machine is in or out of operation.

12. In a machine of the character described, the combination of a machine for forming link mesh, an electrical timing device mounted upon said machine, a supporting means for the mesh over which the latter moves during its process of manufacture, means for actuating said mesh to move over the supporting means one link at a time in a step-by-step manner, a detector which is actuated to engage said link after it has been formed and fed onto the supporting means, a sensitive electrical relay for actuating the detector to engage said link, a source of power for the mesh forming machine, mechanism actuated by the detector which shuts off the source of power from the mesh forming machine should a link fail to be formed and consequently the detector fail to engage with the mesh, and a source of electrical power for actuating the timing device and relay.

13. In a machine of the character described, the combination of a machine for forming link mesh, an electrical timing device mounted upon said machine, a supporting means for the mesh over which the latter moves during its progress of manufacture, means for actuating said mesh to move over the supporting means one link at a time in a step-by-step manner, a detector which is actuated to engage said link after it has been formed and fed onto the supporting means, a sensitive electrical relay for actuating the detector to engage said link, a source of power for the mesh forming machine, stop mechanism actuated by the detector which shuts off the source of power from the mesh forming machine should a link fail to be formed and consequently the detector fail to engage with the mesh, annunciator means for indicating whether the machine is in or out of operation, and a source of electrical power for actuating the timing device, the relay, the stop mechanism and the annunciator means.

14. In an automatic stop mechanism of the character described, the combination of a machine for forming link mesh, an electrical timing device mounted upon said machine, a supporting means for the mesh comprising a stationary drum over which the mesh moves as it is formed, ratcheting means for actuating the mesh to move link by link in a step-by-step manner, a reciprocating detector, a sensitive electrical relay which actuates the detector in response to the actuations of the timing device and causes the detector to abut against each link as it passes before said detector, a source of power for driving the machine, automatic stop mechanism for shutting off said source of power, a second source of power for actuating the automatic stop mechanism by means of the detector when a link fails to be formed, and annunciator means also energized by said second source of power and actuated by the detector for indicating that the machine is stopped.

15. In an automatic stop mechanism of the character described, the combination of a machine for forming link mesh, an electrical timing device mounted upon the machine, a supporting means for the mesh over which the latter moves link by link, a sensitive electrical relay in electrical connection with the timing device, a detector carried by the relay and actuated thereby in response to the impulses of the timing device causing said detector to engage with each link as it is formed, automatic stop mechanism for shutting down the machine if a link fails to be formed also operated by the relay and controlled by certain movements of the detector, a source of power for driving the machine, and a source of electrical energy for actuating the timer, the relay and the automatic stop mechanism.

16. In an automatic stop mechanism of the character described, the combination of a machine for forming link mesh, an electrical timing device mounted upon the machine, a supporting means for the mesh over which the latter moves link by link, a sensitive electrical relay in electrical connection with the timing device, a detector carried by the relay and actuated thereby in response to the impulses of the timing device causing said detector to engage with each link as it is formed, automatic stop mechanism for shutting down the machine if a link fails to be formed also operated by the relay and controlled by certain movements of the detector, a source of power for driving the machine, annunciator means for indicating that the machine is stopped, and a source of electrical energy for actuating the timer, the relay, the automatic stop mechanism and the annunciator means.

17. In automatic mechanism for moving machinery, the combination of an automatic machine, a suitable source of power for driving the machine, a supporting means over which the product of the machine moves, a detector mounted in operative relation with the product on said supporting means and actuated to stop the machine by a certain relation of its position with respect to the product, adjusting means for adjusting the position of the detector with respect to the product, and mechanism operated by the detector for shutting off the source of power to stop the machine when the detector is actuated for that purpose.

18. In automatic mechanism for moving machinery, the combination of an automatic machine, a suitable source of power for driving the machine, a supporting means over which the product of the machine moves, an electrical timing device on the machine, an electrically actuated relay actuated by the timing device, a detector operated by the relay when the latter is actuated by the timing device, the said detector coöperating with the product of the machine to determine its condition during the process of manufacture, contacts on the relay the closing of which is determined by a certain action of the detector, an electrical circuit which is controlled by the closing of said contacts, an electric latching device and an electrically operated annunciator means in said circuit, a main circuit, a switch in said main circuit which is controlled by the latching device in the first-mentioned circuit to open the main circuit and shut off the source of power for the machine, and a low voltage generator for supplying electrical energy to the circuit in which is included the timing device, the relay, the latching device, and the annunciator means.

19. In automatic stop mechanism for moving machinery, the combination of an automatic machine for forming link mesh, a suitable source of power for driving the machine, a supporting means over which the product of the machine moves, an electrical timing device on the machine, an electrically actuated relay actuated by the timing device, a detector operated by the relay when the latter is actuated by the timing device, the said detector coöperating with the product of the machine to determine its condition during the process of manufacture, a spring for returning the detector to its initial position after each of its actuations by the relay, an adjusting means for adjusting the tension of the spring, a flexible member connecting the spring and the adjusting means therefor, contacts on the relay the closing of which is determined by a certain action of the detector, an electrical circuit which is controlled by the closing of said contacts, an electric latching device and an electrically operated annunciator means in said circuit, a low voltage generator for supplying electrical energy to the last-mentioned circuit, and an intermediary means between the latching device and the source of power for the machine controlled by the latching device to shut off said source and stop the machine.

20. In automatic stop mechanism for moving machinery, the combination of an automatic machine for forming link mesh, a suitable source of power for driving the machine, a supporting means over which the product of the machine moves, an electrical timing device on the machine, an electrically actuated relay actuated by the timing device, a detector operated by the relay when the latter is actuated by the timing device, the said detector coöperating with the product of the machine to determine its condition during the process of manufacture, contacts on the relay the closing of which is determined by a certain action of the detector, an electrical circuit which is controlled by the closing of said contacts, an electric latching device and an electrically operated annunciator means in said circuit, a low voltage generator for supplying electrical energy to the last mentioned circuit, an indicating signal operated by the source of power for the machine and displayed continuously while the machine is running, and an intermediary means between the electric latch and the source of power for the machine for throwing out of operation the machine and the last mentioned signaling means when the latch is actuated for that purpose.

In testimony whereof I affix my signature in presence of two witnesses.

ARCHIBALD THOMAS SAMPSON.

Witnesses:
  JOHN A. McMANUS, Jr
  ARTHUR F. KEEFE.